July 26, 1966  R. J. DEISENROTH  3,263,014
METHOD AND APPARATUS FOR BEDDING PANELS INTO FRAMES
Filed Sept. 10, 1962  4 Sheets-Sheet 1
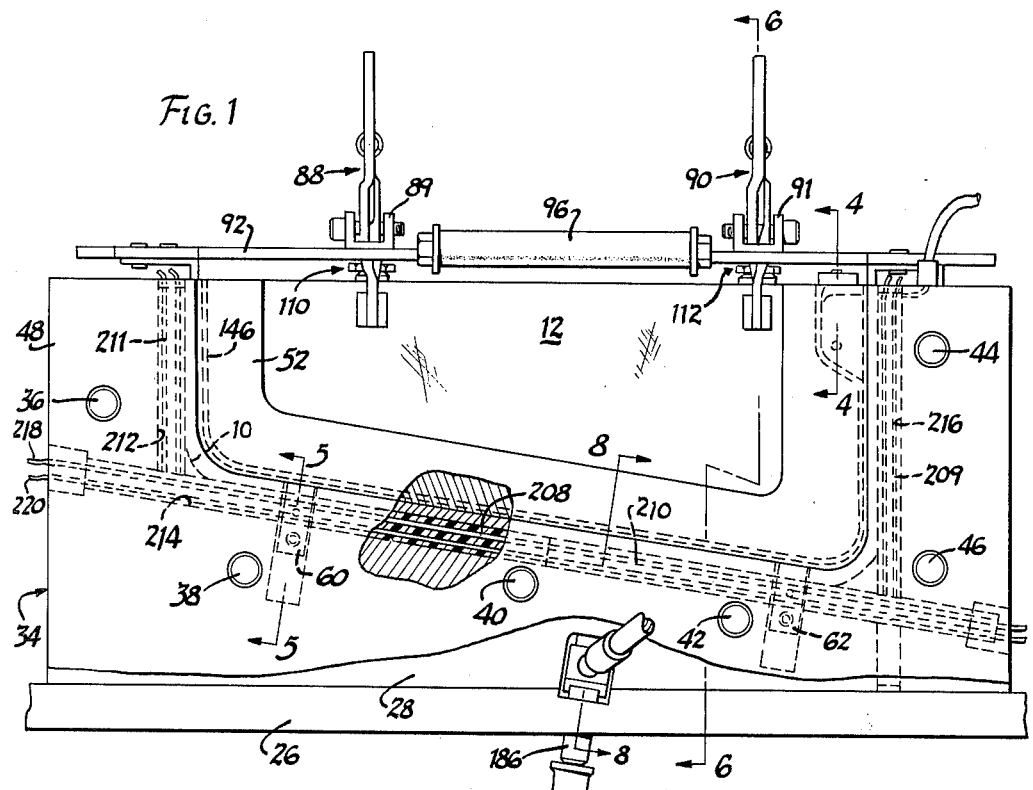
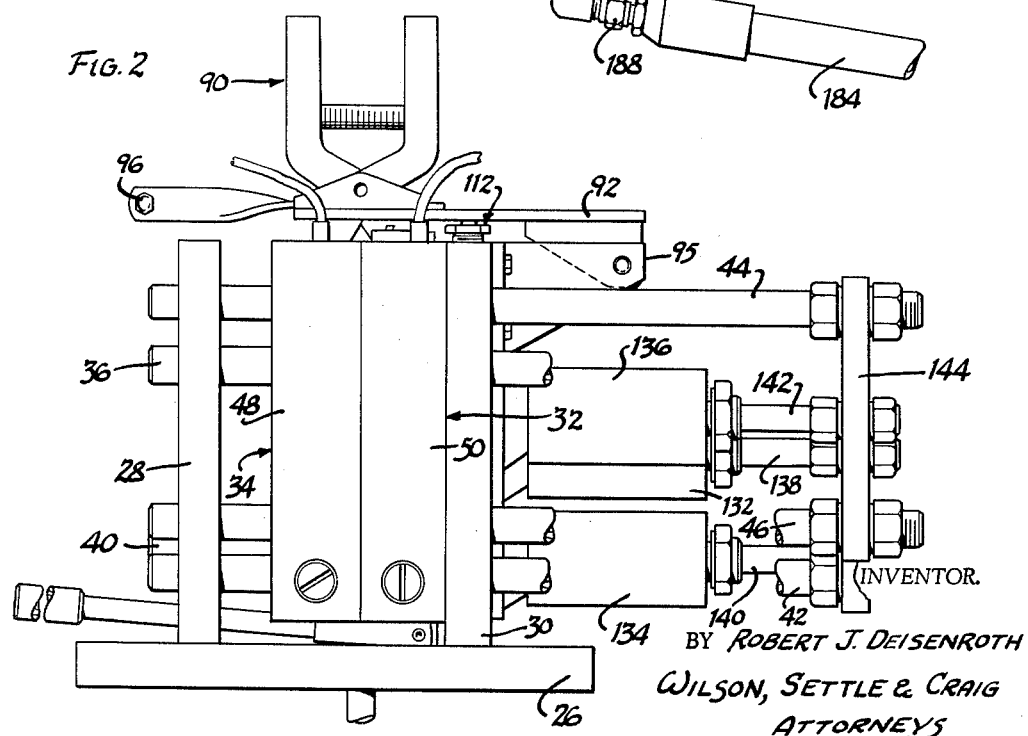
INVENTOR.
BY ROBERT J. DEISENROTH
WILSON, SETTLE & CRAIG
ATTORNEYS July 26, 1966 R. J. DEISENROTH 3,263,014
METHOD AND APPARATUS FOR BEDDING PANELS INTO FRAMES
Filed Sept. 10, 1962 4 Sheets-Sheet 2

INVENTOR.
ROBERT J. DEISENROTH
BY
WILSON, SETTLE & CRAIG
ATTORNEYS

INVENTOR.
ROBERT J. DEISENROTH
BY
WILSON, SETTLE & CRAIG
ATTORNEYS

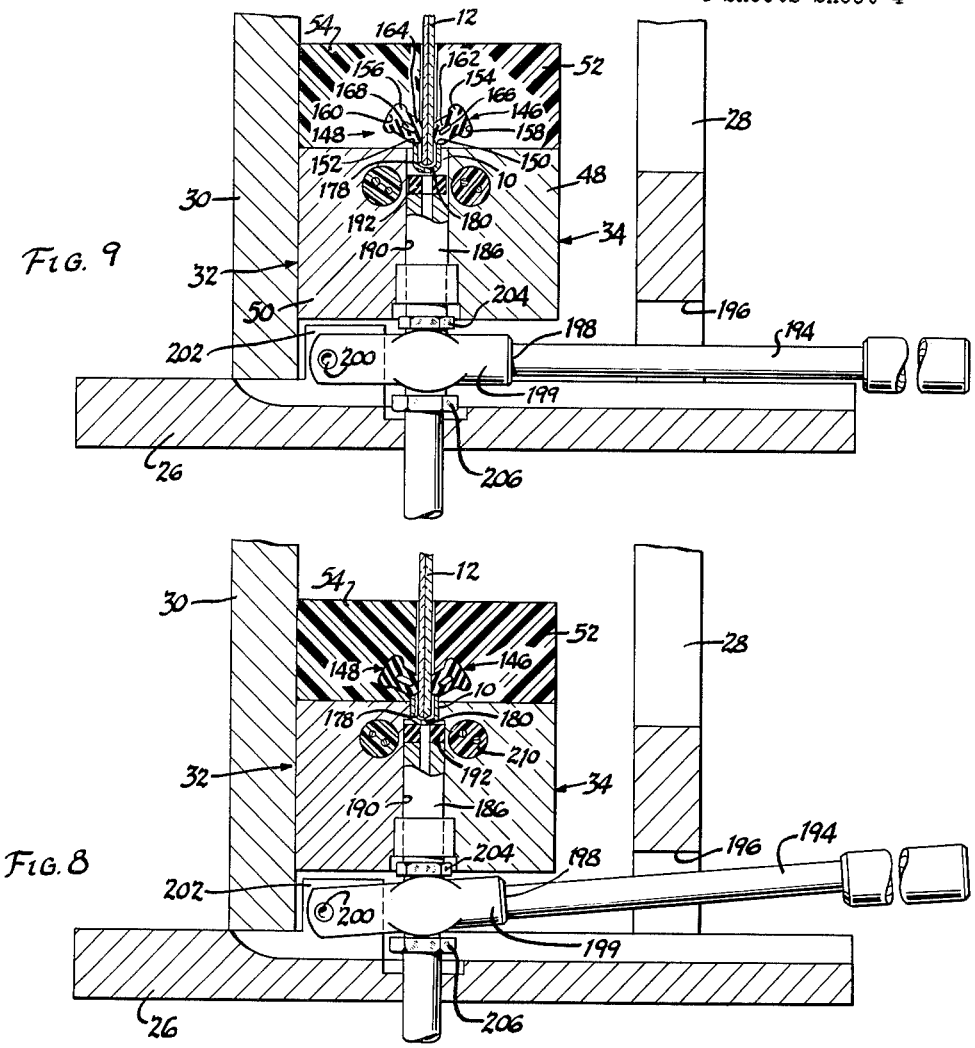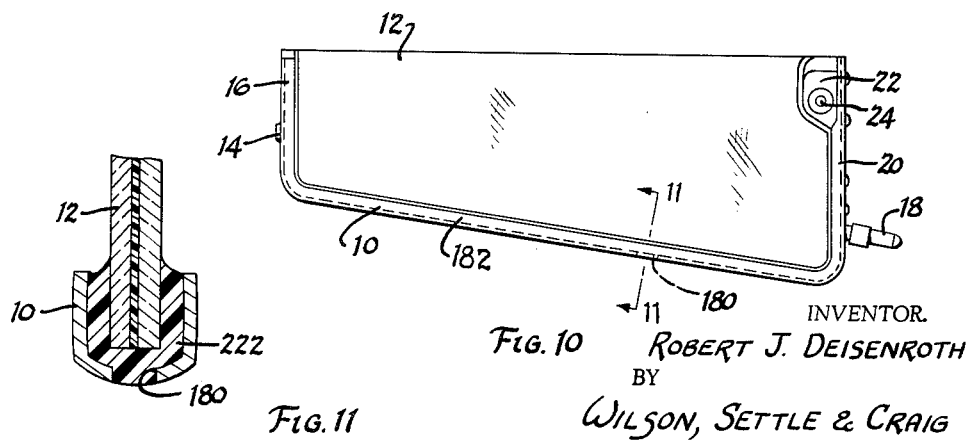

United States Patent Office 3,263,014
Patented July 26, 1966

3,263,014
METHOD AND APPARATUS FOR BEDDING
PANELS INTO FRAMES
Robert J. Deisenroth, Elkhart, Ind., assignor to Excel
Corporation, Elkhart, Ind., a corporation of Indiana
Filed Sept. 10, 1962, Ser. No. 222,590
11 Claims. (Cl. 264—261)

This invention relates to a method and apparatus for bedding panels into frames, and more particularly to a method and apparatus for bedding in which the bedding material is initially injected between the frame and panel as a liquid and is subsequently cured to a solid state to form a permanent bedding for the panel.

The present invention may be used in a variety of different bedding applications. It is, however, particularly useful for bedding automobile window elements into channel frames. As is well known, automobile windows, for example, vent windows, are frequently provided with metal frames into which the glass is bedded. In vent windows, the channel normally extends around three sides of the glass leaving one side of the glass unframed. The assembling and bedding of glass into metal frames has always presented a problem. Such bedding has been done in the past by manual assembly techniques. It has long been considered desirable to automatically bed the glass into a frame, however, it has heretofore not been possible to overcome the problems involved in automating this operation. The principal difficulty has resided in the physical and dimensional characteristics of commercial glass. Glass is of course brittle and hard, and is easily scratched and broken thus making it difficult to handle glass by mechanical means. Additionally, commercially available glass varies considerably in thickness. It is commercially practical to compensate for the different thicknesses of glass in a manual assembly technique but difficult to do so in automated processes.

The manual technique of glazing window glass into a frame conventionally comprises inserting a pane of glass the edge of which is covered with a strip or sheet of oil-coated unvulcanized rubber into the frame. Different thicknesses of rubber may be used to compensate for differences in glass thickness. The edges of the rubber strip extend out of the frame and this excess is manually trimmed off by use of a hot knife. The parts of this process which have been most difficult to automate are the use of different tape thicknesses and the trimming of the excess rubber.

The disadvantages of this process, in addition to the relatively high cost of the labor involved, are that the process is inherently messy, requiring a cleaning or washing operation after the bedding, the fact that such rubber strips do not weather well and often the glass becomes loosely framed after a period of outdoor exposure, and the requirement for different tape thicknesses to accommodate variations in the thickness of commercial glass.

The present invention overcomes these disadvantages in the provision of a process in which the bedding material is injected into the frame and glass assembly in liquid form and subsequently cured to solid form. This process provides a resilient bedding which adheres to the glass and to the metal frame. It additionally automatically compensates for variations in glass thickness, does not require trimming, is a clean procedure and does not require washing or other cleaning of the glass and frame assembly, it is applicable to high production techniques, permits use of channel frames having shorter legs and use of lighter gage framing materials, and provides a water-tight seal without supplementary use of additional sealers or other materials.

It is, therefore, an object of the invention to provide a low cost method for bedding panels into frames.

Another object of the invention is to provide a method for bedding in which the bedding material is injected as a liquid and is subsequently cured to a hardened state.

Another object of the invention is to provide a superior adhesion of the bedding material to the panel and frame and to provide a bedding material which will not deteriorate after considerable outdoor exposure.

A still further object of the invention is to provide a bedding process which is relatively clean and does not require washing of the assembly subsequent to the bedding operation.

Other objects of this invention will appear in the following description and appended claims, references being had to the accompanying drawings forming a part of this specification wherein like reference characters designate corresponding parts in the several views.

In the drawings:

FIGURE 1 is a front elevational view of apparatus for bedding glass into a metal frame in accordance with one embodiment of the present invention, showing the glass and frame mounted in the apparatus ready for bedding and with parts broken away for the purpose of clarity;

FIGURE 2 is a right end elevational view of the apparatus of FIGURE 1;

FIGURE 8 is a sectional view taken substantially along the line 8—8 of FIGURE 1 looking in the direction of the arrows showing the means for injecting liquid bedding material into the frame assembly;

FIGURE 9 is a sectional view similar to FIGURE 8 illustrating the injection means prior to actuation thereof into injecting position;

FIGURE 10 is a front elevational view of an automobile vent window which has been assembled and bedded in accordance with the present invention; and FIGURE 11 is a sectional view taken substantially along the line 11—11 of FIGURE 10 looking in the direction of the arrows.

Figure 3:
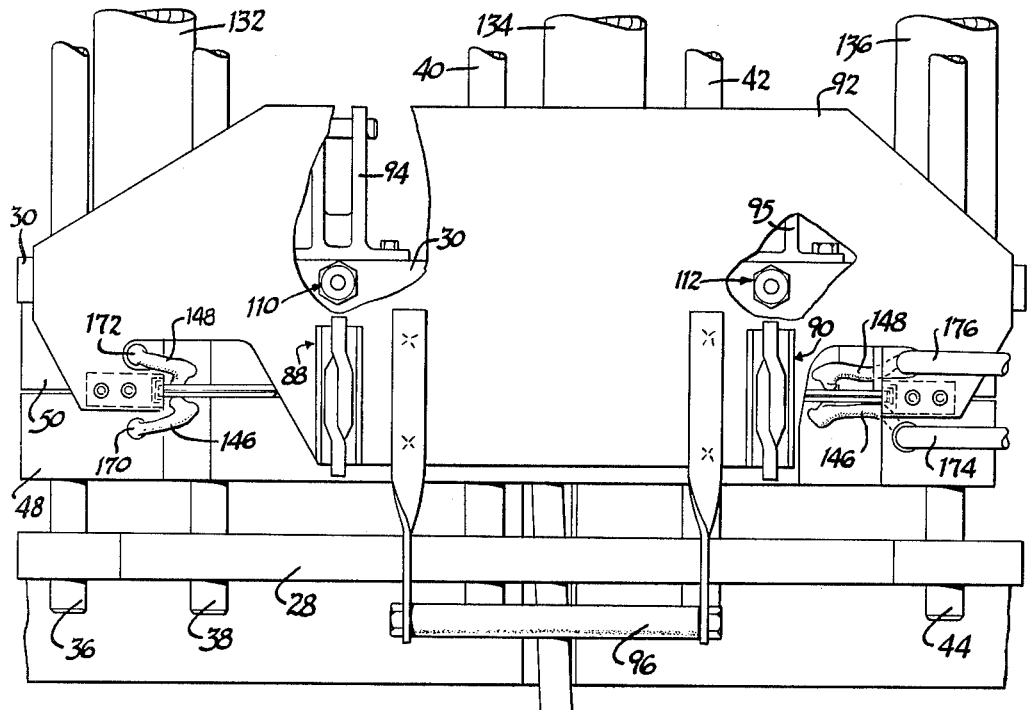
FIGURE 3 is a top plan view of the apparatus of FIGURE 1 with parts broken away for the purpose of clarity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phaseology or terminology employed herein is for the purpose of description and not of limitation.

The method of the present invention may be briefly outlined in the following four steps:

(1) Positioning the glass in a channel frame, the glass being spaced from the frame to provide a space for the bedding material between the glass and frame.

(2) Sealing the space between the edges of the frame and the glass to form a liquid-tight cavity between the outer edge portions of the glass and the frame channel for the bedding material.

(3) Injecting liquid bedding material into the thus formed cavity in an amount sufficient to fill the cavity.

(4) Heating and curing the bedding material to form a solid, resilient bed for the glass in the frame.

The type of vent window adapted to be assembled and bedded in accordance with the disclosed embodiment of the invention is illustrated in FIGURE 10. It is to be appreciated, however, that other window shapes and sizes may be assembled and bedded in accordance with the invention and that other panel members aside from glass may be bedded into frames in accordance with the invention.

The vent window shown in FIGURE 10 comprises a U-shaped channel-section metal frame 10 in which is mounted and bedded in place a safety glass element 12. The glass 12 is shown as having a laminated construction. However, solid heat-treated safety glass may also be used. The vent window is mounted in an automobile in a position rotated 90° clockwise from that shown. A socket 14 is provided on the upper leg 16 of the frame to pivotally receive a pin. A pin 18 is provided on the lower leg 20 of the frame for pivotal reception in a socket provided in the automobile. These elements thus serve to pivotally mount the vent window as is conventional in automobiles. A handle bracket 22 is secured to the frame and has a stud 24 for the pivotal reception of a locking handle (not shown) to facilitate releasably locking the vent window when it is mounted in an automobile.

Referring to FIGURES 1, 2 and 3, it will be noted that apparatus is disclosed for bedding the glass 12 into the frame 10. The apparatus includes a base 26 upon which is fixedly mounted a pair of spaced apart upright plates 28, 30, the plate 28 being substantially U-shaped and the plate 30 being substantially rectangular. A fixed clamping member 32 is mounted on the plate 30. A movable clamping member 34 is provided adjacent to the clamping member 32. The movable member 34 is mounted on a plurality of slidable rods 36, 38, 40, 42, 44, 46. The rods are fixedly attached to the clamping member 34 and carry this member into and out of abutment with the clamping member 32.

Each of the clamping members had substantially the same construction. These members include a U-shaped metal member 48, 50 in which is mounted a U-shaped non-metallic thermal insulating member 52, 54. The members 52, 54 may, for example, be a laminated phenolic. The members 52, 54 shield the glass and rubber seals from both conduction and radiation of the heat involved in the process. The U-shape of these members conforms generally to the shape of the window frame 10. As will be noted in the various views, for example, FIGURE 7, a groove 56, 58 following the contour of the frame 10 is provided on the inner face of each clamping member 32, 34 to receive and position the frame 10. The frame 10 is initially inserted into the apparatus with the movable clamping member 34 moved out of abutment with the fixed clamping member 32. Means are shown in FIGURES 1, 4 and 5 for retaining the frame 10 in position until such time as the movable clamping member 34 is moved into abutment with the fixed clamping member 32.

Figure 5:
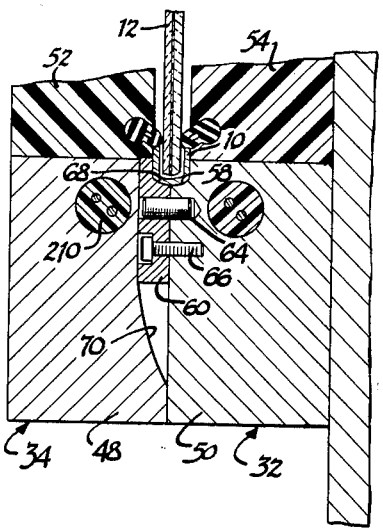
FIGURE 5 is a sectional view taken substantially along the line 5—5 of FIGURE 1 looking in the direction of the arrows and showing means for positioning and retaining a window frame in the apparatus.

Referring to FIGURES 1 and 5, it will be seen that a pair of blocks 60, 62 are provided on the lower portion of the fixed clamping member 32. These blocks are substantially identical and only the block 60 will be described. As shown in FIGURE 5, the block 60 is located with respect to the fixed clamping member by means of a pin 64 and is secured thereto by means of screw 66. The block is provided with a groove 68 which forms an extension of the groove 56 in the movable clamping member 34. Thus, when the frame 10 is inserted into the groove 58 of the fixed clamping member, it will be retained from sliding out of the groove by the block 60. A recess 70 is provided in the inner face of the movable clamping member 34 to permit this member to be closed in abutment with the fixed clamping member 32 without engaging the block 60.

Figure 4:
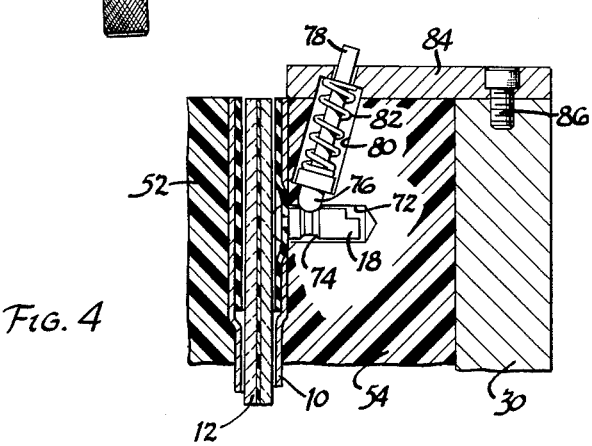
FIGURE 4 is a sectional view taken substantially along the line 4—4 of FIGURE 1 looking in the direction of the arrows showing means for initially securing the window frame in the apparatus.

Additional means for retaining the frame 10 in position are shown in FIGURE 4. The configuration of the particular frame under consideration is taken advantage of in the structure shown in FIGURE 4. A recess 72 is provided in the member 54 to receive the pin 18 of the frame. The pin 18 has a circumferential groove 74 which releasably engages the head 76 of a pin 78 which is mounted for axial movement in a recess 80. A spring 82 is provided to urge the pin 78 into releasable engagement with the groove 74 of the pin 18. The entire assembly is held in place by a plate 84 which is secured to the plate 30 by a screw 86. The pin 18 is manually moved into and out of engagement with the pin 78 by forces manually applied to the frame 10.

After the frame 10 has been mounted in the fixed clamping member 32, the glass 12 is inserted into the frame. The glass 12 is positioned with respect to the frame by means of a pair of manually operable clamps 88, 90. The clamps 88, 90 are mounted on brackets 89, 91 provided on a top plate 92 which is hingedly secured to brackets 94, 95 provided on the rear face of the plate 30. A handle member 96 is provided on the plate 92 for manually swinging the plate into position for clamping the glass 12.

Figure 7:
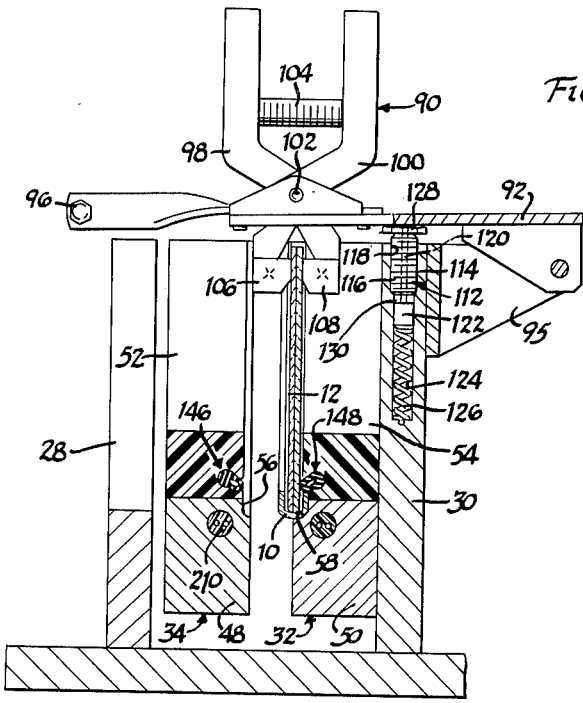
FIGURE 7 is a sectional view similar to FIGURE 6 illustrating the apparatus prior to clamping of the fixture on the glass and frame assembly.

The clamps have the same structure and the clamp 90 is illustrated in FIGURE 7. The clamp 90 includes a pair of Z-shaped members 98, 100 pivotally secured at 102 and urged into clamping position by a spring 104. Resilient clamping members 106, 108 are provided for direct engagement with the glass.

After the glass 12 has been inserted into the frame 10, the plate 92 is swung over the glass 12 and the clamps 88, 90 are opened to receive the glass. As will be noted in FIGURE 7, the glass initially bottoms on the frame 10. It is, of course, necessary to position the glass 12 slightly above the frame 10 to permit the injection of glazing materials between the glass and frame. This positioning is accomplished by means of a pair of positioning structures 110, 112 which are provided in the plate 30 beneath the top plate 92.

Figure 6:
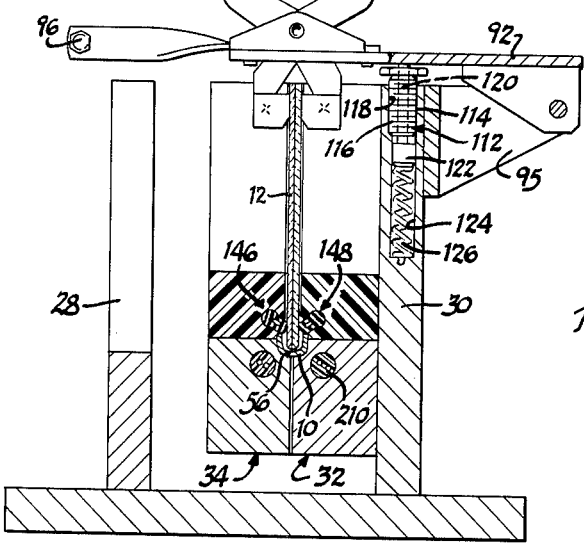
FIGURE 6 is a sectional view taken substantially along the line 6—6 of FIGURE 1 looking in the direction of the arrows.

The positioning structures are identical and one of the structures 112 is shown in FIGURES 6 and 7. This structure comprises a bolt 114 having a shank 116 threadingly received in threaded openings 118 provided in the plate 30. The bolt 114 has an axial opening therethrough in which slidingly extends pin 120. The pin 120 has secured to its lower end a slug 122 which is slidingly received in a recess 124 which forms an extension of the threaded opening 118. A spring 126 is provided in the recess 124 to constantly urge the slug 122 and pin 120 upwardly. The plate 92 engages the upper end of the pin 120 when the plate is swung into the depressed position illustrated in FIGURE 7. The operator manually depresses the plate 92 until it abuts against the head 128 of the bolt 114. The clamps 88, 90 are then closed to engage the glass 12. Upon release of the plate 92, the spring 126 will force the pin 120 upwardly and consequently move the plate 92 a short distance upwardly as illustrated in FIGURE 6. This will carry the glass 12 a short distance upwardly to space the glass the desired distance from the frame 10 as shown in FIGURE 6. The distance which the glass 12 is moved may be varied by inserting washers 130 on the pin 120 between the slug 122 and lower end of the shank 116.

After the glass 12 has been mounted and positioned with respect to the frame 10, the movable clamping member 34 is moved into abutment with the fixed clamping member 32. This movement is accomplished by three double acting air cylinders 132, 134, 136 which are mounted in spaced apart relationship on the rear face of the plate 30. It will be appreciated that hydraulic or other power means may be used in place of air cylinders. The air cylinders have piston rods 138, 140, 142 which extend therefrom and are suitably bolted at their outer ends to a plate 144. The rods 36, 38, 40, 42, 44, 46 are also suitably bolted to the plate 144 as illustrated in FIGURE 2. These rods are guided in openings provided in the plates 28, 30 and, as previously mentioned, are secured to the movable clamping member 34. When the air cylinders are actuated to move the piston rods 138, 140, 142 to the right as view in FIGURE 2, they will carry the plate 144 to the right. The plate 144 will carry the rods 36, 38, 40, 42, 44, 46 to the right and move the clamping member 34 into abutment with the fixed clamping member 32 as illustrated in FIGURE 6. The groove 56 in the movable clamping member will then be seated around the frame 10, retaining this member firmly in position.

As will be noted in the various figures, a tubular sealing member 146, 148 is provided in each of the clamping members 32, 34 to seal the space between the glass 12 and the edges 150, 152 of the frame 10. This forms a liquid-tight cavity for the bedding material. The sealing members 146, 148 follow the contour of the frame 10 to provide a continuous seal from one end of the frame to the other. The sealing members are fabricated from an elastomeric material such as silicone rubber which can stand relatively high temperatures without degradation. Each sealing member includes an arcuate portion 154, 156 which is received in a slot 158, 160 provided in the members 52, 54 to retain the sealing members in place. A second arcuate portion 162, 164 of the sealing members 146, 148 extends outwardly from the slot 158, 160 and into engagement with the edges 150, 152 of the frame 10 and with the surface of the glass 12 when the clamping members are positioned as shown in FIGURE 9.

After the clamping members 32, 34 have been moved together as shown in FIGURE 9, the sealing members 146, 148 are inflated by air pressure to provide a high pressure liquid-tight seal. As will be noted, a passageway 166, 168 is provided in the arcuate portions 162, 164. Referring to FIGURE 3, the passageways are sealed at one end 170, 172 and are connected to air hoses 174, 176 at the opposite end. Air under pressure is supplied through the hoses 174, 176 to inflate or expand the portions 162, 164 of the sealing members to result in the desired high pressure, liquid-tight seal. At the termination of the bedding operation, the pressure in the sealing members 146, 148 is reduced to atmospheric pressure to return these members to their initial condition ready for a successive bedding operation. Instead of sealing one end of the members 146, 148, both ends may be open and pressure applied simultaneously at both ends. Additionally, the pressurizing fluid may be either a liquid or gas such as air. The sealing members themselves may be of a solid, relatively soft elastomeric material which would not require inflation to form the desired seal.

After the glass frames have been mounted in the clamping members 32, 34 and the sealing members 146, 148 have been inflated, a liquid heat-curable bedding material is injected into the cavity 178 formed by the frame 10, the glass 12, and the sealing members 146, 148. Sufficient of the bedding material is injected to completely fill the cavity 178. The bedding material may, for example, be injected through either end of the frame 10, with the assembly being oriented in different positions such as vertical, horizontal or any angle in between. The bedding material is preferably injected in a manner to drive all of the air out of the cavity 178 in order to prevent captivation of air as air bubbles in the bedding material. To accomplish this, one opening must be provided into the cavity 178 for the injection of the glazing material and at least one other opening must be provided for the escape of air.

In the present embodiment of the invention, the bedding material is injected through an opening 180 in the frame portion 182 as may be seen in FIGURE 10. Air escapes through the ends of the frame 10. The bedding material travels in both directions towards the frame legs 16, 20 and rises up these legs, driving before it any air which may be trapped in the cavity 178. The opening 180 is desirably located at a point which results in filling the cavity portions to the left and right of the opening in about the same time. As will be noted in FIGURE 10, the opening 180 is located closer to the leg 20 than to the leg 16. This is the volumetric center of the cavity formed by the frame and window and results in both halves being filled during the same time period.

The type of bedding material utilized in the invention may be any suitable resinous material which has the following properties:

(1) Resiliency—to provide a suitable bedding for the glass.

(2) Adherence—to provide a bond between the glass and metal frame.

(3) Curability—to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stresses normally encountered in the use of the final assembly.

The bedding material may be any suitable thermoplastic or thermosetting plastic material. One class of resins suitable as bedding materials are the polyurethane resins. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and a triisocyanate.

The means for injecting the bedding material into the cavity 178 are best illustrated in FIGURES 1, 8 and 9. A flexible conduit 184 is connected to a vertically movable nozzle 186 by connector 188. Liquid bedding material is supplied under pressure through the conduit 184 from a suitable source (not shown). The nozzle 186 extends between the clamping members 32, 34 in a recess 190 formed in these members. The nozzle is positioned in line with the opening 180 in the frame 10. As will be noted in FIGURE 8, the nozzle has a compressible tip 192 which sealingly abuts against the frame 10 when the nozzle is in its uppermost position to permit injection of bedding material into the cavity 178. The nozzle is moved to the lowermost position shown in FIGURE 9, at the termination of injecting bedding material into the cavity 178. Nozzle movement is effected by means of a handle 194 which extends through an opening 196 in the plate 28. The handle 194 is releasably received in a socket 198 of fork bracket 199. The bracket 199 is pivotally mounted at 200 to a bracket 202 provided on the base 26. The bracket 199 is received between spaced apart annular shoulders 204, 206 provided on the nozzle 186. As will be appreciated, when the nozzle is to be moved upwardly, the handle 194 is pivoted upwardly whereupon the bracket 199 engages the shoulder 204 to drive the nozzle upwardly to the position shown in FIGURE 8. Bedding material is then injected through opening 180 to fill the cavity 178. At the conclusion of the injection operation, the handle 194 is moved downwardly whereupon the bracket 199 engages the shoulder 206 to retract the nozzle.

After the bedding material has been injected into the cavity 178, heat is applied to cure the bedding material to a solid state as shown at 222 in FIGURE 11 to form a permanent resilient bedding for the glass 12. Heating is accomplished by means of four heater cartridges 208, 209, 210, 211 provided in the members 48, 50. As will be noted in FIGURE 1, intersecting passageways 212, 214, 216 are provided in the members 48, 50 closely adjacent to the frame 10. The heater cartridges comprise a continuous wire encased in a heat resistant insulating material. The wires are looped and extend into the portions of passageways 212, 214, 216 which are adjacent to the frame 10. The wire ends extend out of the clamping members and electrical power is applied thereto to cause the heating cartridges to become hot to thereby raise the temperature of the metal members 48, 50 in contact with the frame 10 and thereby heat and cure the glazing material in the cavity 178. The provision of four separate cartridges permits close control of the temperature at different portions of the apparatus. It is desirable to control the temperature to provide a temperature gradient from the point of injection 180 to the ends of frame 10. The temperature is preferably diminished in the direction of bedding material flow.

At the conclusion of curing of the bedding material, the clamping members 32, 34 are separated to permit removal of the finished window assembly. As shown in FIGURE 11, the glass 12 at this time is imbedded in the bedding material 222, which is in adherent contact with both the glass and the frame.

Having thus described my invention, I claim:

1. The method of bedding a panel into a frame having a channel for the reception of edge portions of the panel comprising the steps of positioning edge portions of the panel within the frame channel in spaced apart relationship with the channel surface, applying sealing means between the frame and panel to form a liquid-tight cavity defined by the channel surface, the edge portions of the panel and the sealing means, then injecting a heat-curable liquid bedding material into said cavity, and then heating the bedding material until said material is cured to a solid form.

2. The method of bedding a panel into a frame having a channel for the reception of edge portions of the panel comprising the steps of locating the frame with respect to the panel in a position where edge portions of the panel project into the frame channel but do not touch the frame, applying a sealing element on each side of the panel between the frame and panel to form a liquid-tight cavity defined by the channel surface, the edge portions of the panel projecting into the channel and the sealing elements, then injecting a heat-curable liquid bedding material into said cavity, and then heating the bedding material until said material is cured to a solid form.

3. A method of bedding a panel into a frame having a channel for the reception of edge portions of the panel comprising the steps of positioning edge portions of the panel within the frame channel in spaced apart relationship with the channel surface, applying a tubular expandable resilient sealing element on each side of the panel between the panel and frame, applying fluid pressure to the interior of the sealing elements to expand said elements into sealing engagement with the panel and frame to form a liquid-tight cavity defined by the channel surface, the edge portions of the panel and the sealing elements, then injecting a heat-curable liquid bedding material into said cavity, and then heating the bedding material until said material is cured to a sold form.

4. The method of bedding a panel into a frame having a channel for the reception of edge portions of the panel comprising the steps of interposing edge portions of the panel within the frame channel in spaced apart relationship with the channel surface, providing a tubular expandable resilient sealing element on each side of the panel, contacting the frame and panel exteriorly of the frame channel with said sealing elements, expanding said sealing elements by the application of fluid pressure to the interior thereof into sealing engagement with the frame and panel to form a liquid-tight cavity defined by the channel surface, the edge portions of the panel and the sealing elements, then filling said cavity with a curable liquid bedding material, and then curing the bedding material to a solid form.

5. The method of bedding a panel into a frame having a channel for the reception of edge portions of the panel comprising the steps of locating the frame with respect to the panel in a position where edge portions of the panel project into the frame channel but do not touch the frame, applying a sealing element on each side of the panel between the frame and panel to form a liquid-tight cavity defined by the channel surface, the edge portions of the panel projecting into the channel and the sealing elements, providing at least two openings to said cavity, then injecting a heat-curable liquid bedding material through one of said openings into said cavity, the other of said openings permitting entrapped air to escape from the cavity during injection of the bedding material, and then heating the bedding material until said material is cured to a solid form.

6. The method of bedding a panel into a frame having a channel for the reception of edge portions of the panel comprising the steps of inserting edge portions of the panel within the frame channel in spaced apart relationship with the channel surface, applying a sealing means between the frame and panel to form a liquid-tight cavity defined by the channel surface, the edge portions of the panel and the sealing means, then injecting a heat-curable liquid bedding material into said cavity, then heating the bedding material until said material is cured to a solid form, and heat-shielding the major portion of the panel from the heat of curing.

7. The method of bedding a panel into a frame having a channel for the reception of edge portions of the panel comprising the steps of inserting edge portions of the panel into the channel to contact the innermost surface of the channel with the panel edge, withdrawing the panel a specified distance from said innermost surface to a position where the edge portions of the panel project into the channel but do not touch the channel surface, contacting the frame and panel exteriorly of the channel with sealing means to form a liquid-tight cavity defined by the channel surface, the edge portions of the panel, and the sealing means, then filling said cavity with a curable liquid bedding material, and then curing the bedding material to a solid form.

8. The method of bedding a panel into a frame having a channel for the reception of edge portions of the panel comprising the steps of locating the frame with respect to the panel in a position where edge portions of the panel project into the frame channel but do not touch the frame applying a sealing element on each side of the panel between the frame and panel to form a liquid-tight cavity defined by the channel surface, the edge portions of the panel projecting into the channel and the sealing elements, providing an opening in said channel at substantially the volumetric center of the liquid-tight cavity, leaving the outer ends of said liquid tight cavity open, then injecting a heat-curable liquid bedding material through said opening, the open cavity ends permitting entrapped air to escape from the cavity during injection of the bedding material, and then heating the bedding material until said material is cured to a solid form.

9. Apparatus for bedding a panel into a frame having a channel for the reception of edge portions of the panel comprising means to locate and hold the frame with respect to the panel in a position where edge portions of the panel project into the frame channel but do not touch the frame, sealing means positionable on each side of the panel and extendable between the frame and the panel to form a liquid-tight cavity defined by the channel surface, the edge portions of the panel projecting into the channel and the sealing means, means for injecting a heat-curable liquid bedding material into said cavity, and means for heating the bedding material in said cavity to cure said material to a solid form.

10. Apparatus for bedding a panel into a frame having a channel for the reception of edge portions of the panel comprising means for positioning edge portions of the panel within the frame channel in spaced apart relationship with the channel surface, sealing means positionable between the frame and panel to form a liquid-tight cavity defined by the channel surface, the edge portions of the panel, and the sealing means, means for injecting a heat-curable liquid bedding material into said cavity, and means for heating the bedding material in said cavity to cure said material to a solid form.

11. A device for bedding a panel into a frame having a channel for the reception of edge portions of the panel comprising means for positioning edge portions of the panel within the frame channel in spaced apart relationship with the channel surface, a tubular expandable resilient sealing element positioned on each side of the retained panel, said sealing elements being extendable between the panel and frame, means for applying fluid pressure to the interior of the sealing elements to expand said elements into sealing engagement with the panel and frame to form a liquid-tight cavity defined by the channel surface, the edge portions of the channel and the sealing elements, means for injecting a heat-curable liquid bedding material into said cavity, and means for heating the bedding material in said cavity to cure said material to a solid form.

References Cited by the Examiner
UNITED STATES PATENTS

| | | | |
|---|---|---|---|
| 1,920,986 | 8/1933 | Hutto | 264—261 X |
| 2,390,129 | 12/1954 | Shobert | 264—314 |
| 2,718,664 | 9/1955 | Schweitzer | 264—261 X |
| 2,972,783 | 2/1961 | Russell et al. | 264—261 X |
| 3,058,190 | 10/1962 | Wogulis et al. | |
| 3,074,117 | 1/1963 | Carpenter et al. | |
| 3,132,196 | 5/1964 | Veatch. | |

ROBERT F. WHITE, *Primary Examiner.*

ALEXANDER H. BRODMERKEL, *Examiner.*

F. MARLOWE, L. S. SQUIRES, *Assistant Examiners.*